(12) United States Patent
McLennan et al.

(10) Patent No.: US 6,366,040 B1
(45) Date of Patent: Apr. 2, 2002

(54) METHOD AND APPARATUS FOR CONTROLLABLY MOVING A WINDOW

(75) Inventors: Brian M. McLennan, Rochester Hills; David J. Jaworski, Bloomfield; Gwen L. Woods, Livonia; Robin Lynn Rivard, Farmington Hills; Steven M Sundberg, Canton; Scott W. Westermann, Farmington Hills; Fred Lupton, Dearborn, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/468,274

(22) Filed: Dec. 20, 1999

(51) Int. Cl.[7] .................................................. H02P 3/00
(52) U.S. Cl. ....................... 318/280; 318/264; 318/266; 318/267; 318/466; 318/480; 318/54; 49/26
(58) Field of Search ................................ 318/264, 266, 318/267, 466, 480, 54; 49/26

(56) References Cited

U.S. PATENT DOCUMENTS

| | | | |
|---|---|---|---|
| 4,733,145 A | * | 3/1988 | Ohashi et al. ................. 315/54 |
| 4,835,449 A | | 5/1989 | Huehn |
| 5,278,480 A | | 1/1994 | Murray |
| 5,334,876 A | | 8/1994 | Washelseski et al. |
| 5,449,987 A | * | 9/1995 | McMillian ................... 318/366 |
| 5,537,013 A | | 7/1996 | Toyozumi et al. |
| 5,596,253 A | | 1/1997 | Mizuta et al. |
| 5,616,997 A | | 4/1997 | Jackson et al. |
| 5,663,620 A | | 9/1997 | Mizuno et al. |
| 5,955,854 A | * | 9/1999 | Zhang et al. ................ 318/480 |
| 5,982,124 A | * | 11/1999 | Wang .......................... 318/466 |
| 6,119,402 A | * | 9/2000 | Wisner ......................... 49/362 |
| 6,128,553 A | * | 10/2000 | Gordon et al. .................. 701/3 |

* cited by examiner

*Primary Examiner*—Robert E. Nappi
*Assistant Examiner*—Tyrone Smith
(74) *Attorney, Agent, or Firm*—Ford Global Tech., Inc.

(57) ABSTRACT

An apparatus 10 for controllably moving a vehicle window, which is deployed upon a vehicle 12 of the type having a cab 14 including a rear or "backlight" window 16. Apparatus 10 includes a conventional controller 22 having a memory unit 24, a conventional window actuating motor 26, which is operatively coupled to window 16 and to controller 22, and a user operated switch 28, which is coupled to controller 22. Controller 22 receives signals from switch 28 and utilizes the received signals, in combination with data describing the current state/position of the ignition switch 36 and of motor 26, to selectively provide commands to motor 26, thereby selectively and controllably moving and/or positioning window 16.

8 Claims, 5 Drawing Sheets

METHOD AND APPARATUS FOR CONTROLLABLY MOVING A WINDOW

(1) FIELD OF THE INVENTION

This invention relates to a method and an apparatus for controllably moving a window and more particularly, to a method and an apparatus which allows a vehicle window to be selectively and controllably moved between several desired and predetermined positions.

(2) BACKGROUND OF THE INVENTION

Vehicle "power windows" are typically, selectively, and controllably moved or actuated (e.g., lowered and raised) by one or more electrical and mechanical devices or assemblies, such as and without limitation switches, controllers, and motor/driver assemblies. These power window actuating assemblies allow the passengers and/or the driver of a vehicle to remotely, selectively, and relatively easily lower and raise the windows of a vehicle.

It is often desirable to limit or restrict the range of movement of power windows and/or to limit the number and/or type of positions in which the windows may be operatively disposed or "set" by a user. For example and without limitation, windows, which are disposed within the rear portion or end of the cab of a pick-up truck (i.e., "backlight windows"), are sometimes designed to be movable between only one of three positions: a "fully closed" position, a "fully open" position, and a "vent" position, in which the top edge of the window is "lowered" or resides no more than approximately two inches below the top window seal or below the "fully closed" position.

Because of these constraints and/or regulations on the position of backlight windows, many backlight windows have been adapted and/or designed to remain fully closed at all times or to be only mechanically and/or manually movable between a fully closed position and a fully opened position. One drawback associated with these types of prior backlight windows is that they are relatively difficult to operate or actuate, and do not provide the user with a relatively easy and remote mechanism to actuate the window between fully closed, fully open, and vent positions. Importantly, in "extended-cab" and "four-door" types of pick-up trucks, it is relatively difficult or impossible for the driver of the truck to manually reach the backlight window without first exiting the vehicle.

The present invention addresses these drawbacks and provides a method and an apparatus for selectively and controllably moving a vehicle window between fully open, fully closed, and vent positions.

SUMMARY OF THE INVENTION

It is a first object of the invention to provide a method and an apparatus for selectively and controllably moving a vehicle window which overcomes at least some of the previously delineated drawbacks of the prior systems, devices, and/or methods.

It is a second object of the invention to provide a method and an apparatus for selectively and controllably moving a vehicle window which allows a window to be selectively and operatively disposed in a fully open position, a fully closed position, and a vent position.

It is a third object of the invention to provide a method and an apparatus for selectively and controllably moving a vehicle window which is effective to allow a driver or passenger of a vehicle to controllably move the window from a position remote from the window.

It is a fourth object of the invention to provide a method and apparatus for selectively and controllably moving a vehicle window which substantially prevents the window from being "proportionally" moved.

According to one aspect of the present invention an apparatus for controllably moving a backlight window only to a first, a second and a third position is provided. The apparatus includes a motor which is operatively coupled to the window; a switch which selectively generates a data signal having a value; and a controller which is communicatively coupled to the switch and to the motor, which receives the data signal, and which causes the motor to selectively move the window to a unique one of said first, said second, and said third positions based upon the value of the data signal.

According to a second aspect of the present invention, a method for controllably moving a window between a fully open position, a fully closed position and a vent position is provided. The window is disposed upon a vehicle of the type having a selectively positionable ignition switch having a first position, an accessory position, and a run position. The method comprises the steps of: providing a control switch which selectively generates a command signal having a value corresponding to a unique one of the fully open, the fully closed and the vent positions; receiving the command signal; determining the position of the ignition switch; determining whether the window is moving; and moving the window to the unique one of the fully open, fully closed, and vent positions if the ignition switch resides within a unique one of the run and accessory positions.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
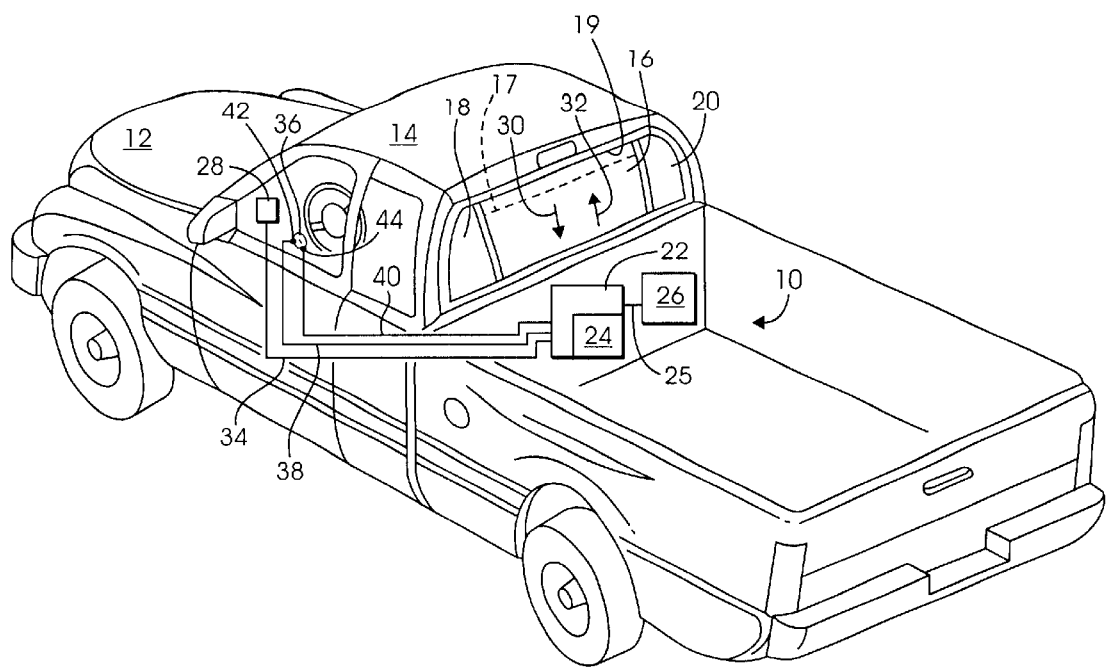
FIG. 1 is a block diagram of an apparatus for controllably moving a window which incorporates the teachings of the preferred embodiment of the invention and which is operatively employed upon and/or within a vehicle.

Referring now to FIG. 1, there is shown an apparatus 10 for controllably moving a vehicle window, which is made in accordance with the teachings of the preferred embodiment of the invention. As shown, apparatus 10 is deployed upon a vehicle 12 of the type having a cab 14 including a rear or "backlight" window 16, which is movably and abuttingly disposed between two stationary side members or windows 18, 20. While the following discussion describes the use of apparatus 10 in connection with vehicle 12, which may for example and without limitation comprise a conventional, "extended-cab" and/or "four-door" pick-up truck, it should be appreciated that apparatus 10 may be operatively deployed upon and/or used in combination with virtually any other type of vehicle (e.g., a van, mini-van, truck, sports-utility vehicle, or car) and/or in combination with any other type of movable window.

Apparatus 10 includes a conventional microprocessor, microcontroller or controller 22 having a memory unit 24, a conventional window actuating motor or driver 26, which is operatively coupled to window 16 and which is electrically, physically, and communicatively coupled to controller 22 by way of a bus or path 25. Apparatus 10 further includes a user-operated switch 28 which is electrically, physically, and communicatively coupled to controller 22 by way of a communications bus or path 34. Controller 22 is further electrically, physically, and communicatively connected by way of communications buses or paths 38, 40 to ignition switch 36, which comprises a conventional selectively positionable vehicle ignition switch, having conventional "OFF", "ACCESSORY", "RUN", and "START" positions.

Particularly, communication bus 38 is coupled to the terminal 42 on the ignition switch 36, which provides power or voltage from the vehicle battery (not shown) when the ignition switch 36 operatively resides in either the "RUN" position or the "ACCESSORY" position, and bus 40 is coupled to the terminal 44 on the ignition switch 36, which provides power or voltage from the vehicle battery at all times, regardless of the position of the ignition switch 44.

As described more fully and completely below, controller 22 receives signals from switch 28 and utilizes the received signals in combination with data describing the current state/position of the ignition switch 36 and of motor 26, and selectively provides commands to motor 26, thereby selectively and controllably moving and/or positioning window 16.

In the preferred embodiment, controller 22 may include one or more microprocessors or integrated circuits which execute or perform the logic control of assembly 10. Memory 24 is a conventional memory unit including both non-volatile or "permanent" memory and volatile or "temporary" memory, and is adapted to and does store at least a portion of the operating software which directs the operation of controller 22. Moreover, memory 24 is also adapted to selectively store other types of data or information, including information associated with the operation of the preferred embodiment of the invention and/or associated historical data, processing data, and/or operational data. As will be more fully discussed below, examples of such data include, but are not limited to, data defining the current "operating state" of assembly 10, the position of window 16, the status and/or position of motor 26, and the status of switch 28. Moreover, as should also be apparent to those of ordinary skill in the art, controller 22 and memory 24 may actually comprise a plurality of commercially available, conventional, and disparate chips or devices, which are operatively and communicatively linked in a cooperative manner.

Motor 26 is a conventional motor adapted to operatively engage window 16 and is effective, under the command and/or control of controller 22, to selectively move window 16 in the directions illustrated by arrows 30 and 32, as described more fully and completely below. In the preferred embodiment of the invention, controller 22, memory 24 and motor 26 are collectively disposed and/or reside within a single structure, housing, or device (not shown).

Figure 2:
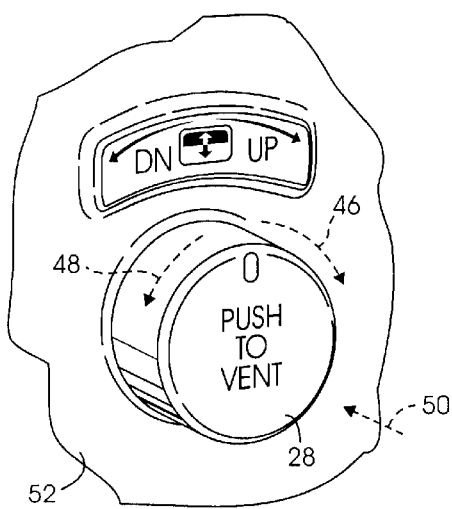
FIG. 2 is a perspective view of one non-limiting embodiment of a switch which is used within the apparatus shown in FIG. 1.

As best shown in FIG. 2, switch 28 comprises a selectively rotatable and depressible "three-position" switch. Particularly, switch 28 is selectively movable or rotatable in the clockwise direction, as illustrated by arrow 46, in the counterclockwise direction, as illustrated by arrow 48, and in the axial direction, as illustrated by arrow 50. Switch 28 selectively generates data or command signals, which have values based upon the position of switch 28, to controller 22. In the preferred embodiment of the invention, switch 28 is "spring loaded" and includes one or more conventional spring elements (not shown) which cause the switch to automatically return to its original position, as shown in FIG. 2, once a user has released or "let go of" the switch. In one non-limiting embodiment, switch 28 includes three separate output terminals (not shown), which are collectively coupled to bus 34, which includes at least three separate lines or electrical conduits for carrying the signals generated at the output terminals and communicating the generated signals to controller 22. In the preferred embodiment of the invention, switch 28 is mounted upon the dashboard 52 of vehicle 12, thereby allowing a driver or "front seat" passenger of the vehicle to selectively and operatively control, move, and/or position window 16, without having to reach backward or exit the vehicle.

In the preferred embodiment of the invention the operative functionality of the system, which is described more fully and completely below, is achieved by the use of certain software and/or firmware operatively stored within apparatus 10 and more particularly, within memory unit 24 and/or within controller 22.

Figure 3:
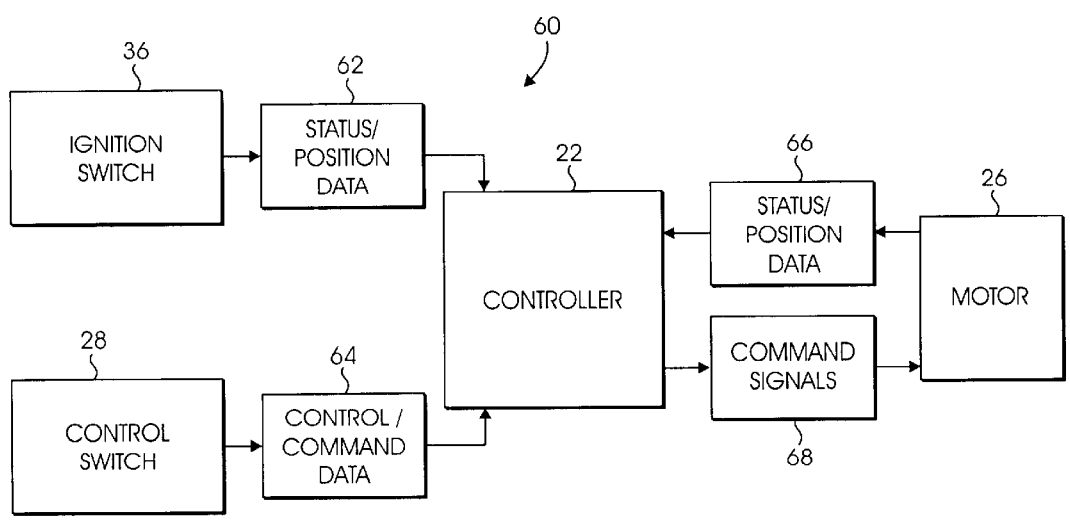
FIG. 3 is a block diagram of the apparatus shown in FIG. 1.

To understand the general operation of apparatus 10, reference is now made to flow chart 60 of FIG. 3, which illustrates the broad functionality of apparatus 10. As shown in FIG. 3, data 62 represents the "status" or position of ignition switch 36 (e.g., the "OFF", "ACCESSORY", "RUN", or "START" position), and is communicated from switch 36 to controller 22 by way of bus 38. Data 64 represents the control or command signals generated by user operated switch 28, and is communicated from switch 28 to controller 22 by way of bus 34. Data 66 is communicated to controller 22 from motor 26 by way of bus 25, and represents the current "status", speed, and/or position of motor 26 and/or of window 16. Controller 22 processes data 66 and uses conventional algorithms and/or equations to determine the position of window 16 and the speed and/or direction of travel of window 16.

As discussed more fully and completely below, controller 22 utilizes data 62–66 to determine the appropriate and/or desired direction, speed, and/or position of window 16, and to selectively generate command signals 68 to motor 26, thereby causing motor 26 to move window 16 in the appropriate and/or desired manner. The manner in which controller 22 processes data 62–66 and selectively activates and/or controls motor 26 depends, in part, on the current "state" or "operating mode" of controller 22.

Figure 4:
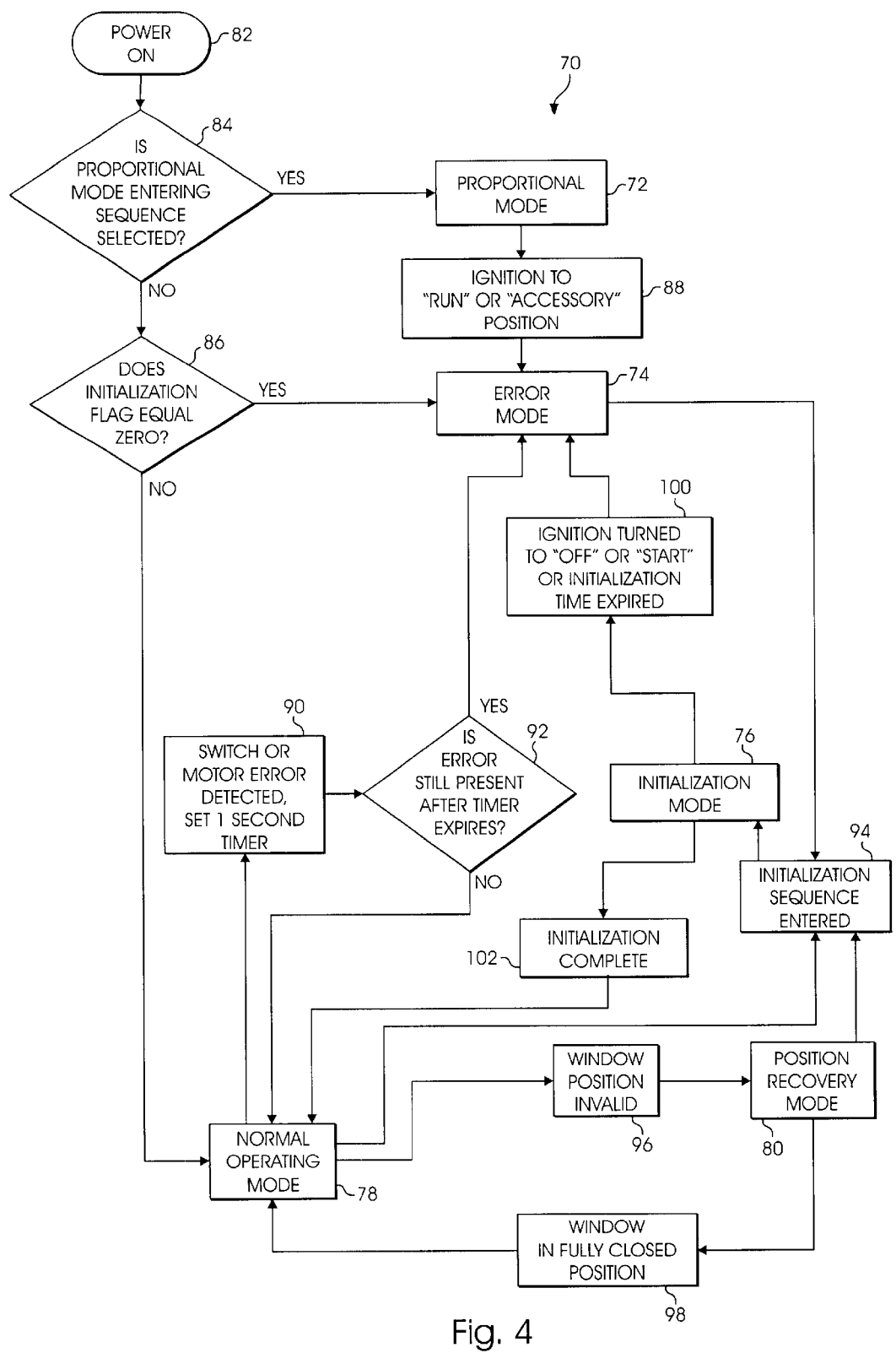
FIG. 4 is a flow chart illustrating the operational functionality of the apparatus shown in FIG. 1.

To more fully understand the various operating modes and the operational functionality of the preferred embodiment of apparatus 10, reference is now made to the operating mode control flow diagram or "flow chart" 70 of FIG. 4. In the preferred embodiment of the present invention, as shown in chart 70, controller 22 selectively operates within five different operating "states" or modes 72–80. Particularly, the operating modes of apparatus 10 include "proportional mode" 72, "error mode" 74, "initialization mode" 76, "normal operating mode" 78, and "position recovery mode" 80. The functionality of apparatus 10 in these various modes 72–80 and the "entry into" or activation of these modes 72–80 is discussed more fully and completely below.

Apparatus 10 is "activated" or "turned on" in block 82 of chart 70, when it is operatively coupled to and/or receives power from the vehicle battery or from an external power supply. Particularly, apparatus 10 receives power when an external power supply is coupled to bus 40; when bus 40 is coupled to terminal 44; and/or when a vehicle battery is installed and/or is electrically connected within vehicle 12. When power is applied to apparatus 10, controller 22 determines, in step 84, whether the proportional mode entering sequence has been selected or performed. In the preferred embodiment of the invention, the proportional mode entering sequence is performed by selecting the "vent" position through switch 28 while simultaneously introducing power to apparatus 10 (e.g., by depressing switch 28 for two seconds while supplying power to apparatus 10). The "proportional mode" entering sequence is intentionally made to be relatively difficult to perform or relatively unlikely to involuntarily occur, thereby substantially preventing an ordinary operator or user of apparatus 10 from accidentally entering into proportional mode 72.

Proportional mode 72 is the only operating mode in which window 16 may be "proportionally" raised and lowered by way of switch 28. Specifically, in proportional mode 72, window 16 moves in the direction of arrow 32 as long as switch 28 is rotated or held in the clockwise position; moves in the direction of arrow 30 as long as switch 28 is held or rotated in the counterclockwise position; and stops moving as soon as switch 28 is released. Proportional mode 72 allows a supplier or manufacturer of apparatus 10 to assemble and/or operatively test motor 26 and apparatus 10. Apparatus 10 exits proportional mode 72 as soon as ignition switch 36 is turned to the "RUN" or "ACCESSORY" position, as shown in block 88, and substantially immediately enters into error mode 74.

If the proportional mode entering sequence has not been selected or performed, controller 22 proceeds to step 86, and checks whether an initialization flag stored within memory 24 is equal to zero or has been "set" to one. If the flag equals zero, controller 22 enters into error mode 74; and if the flag has been "set" (e.g., the flag is equal to one), controller 22 enters into normal operating mode 78.

In error mode 74, any and all movement of window 16 and/or activation of motor 26 is disabled (e.g., window 16 cannot be moved by way of switch 28). However, controller 22 "recognizes", accepts, and stores input signals or commands from switch 28 (e.g., data 64) within memory 24 and/or within a buffer or database table held within memory 24. Controller 22 remains in error mode 74 until an acceptable initialization mode entering sequence is performed. Particularly, controller 22 compares the contents of the buffer or database table with one or more predetermined initialization mode entering sequences, which are stored within memory 24.

In the preferred embodiment of the invention, two acceptable initialization mode-entering sequences are stored within memory 24. A first sequence is adapted for use in an assembly plant and/or a testing environment, where apparatus 10 is originally calibrated to meet the specifications of window 16 and the desired positional and/or movement characteristics or requirements of window 16. The first sequence requires the respective "lines" or conductor paths, which are contained within bus 34 and which connect controller 24 to the "up" and "down" inputs of switch 28, to be simultaneously and electrically coupled to an electrical ground potential, while bus 38 and bus 40 are concomitantly coupled to a positive voltage, such as and without limitation positive 12 volts. A second acceptable initialization mode entering sequence requires the following "steps" or procedures to be accomplished within thirty (30) seconds: ignition switch 36 is turned to the "OFF" position; ignition switch 36 is turned to the "RUN" position; switch 28 is depressed six (6) consecutive times; ignition switch 36 is turned to the "OFF" position; switch 28 is depressed six (6) consecutive times; and ignition switch 36 is turned to the "RUN" position. If either of these initialization mode-entering sequences is completed, as represented by block 94, controller 22 enters initialization mode 76. In other alternate embodiments, other different and/or additional initialization mode entering sequences are stored within memory 24 and are "recognized" or accepted by controller 22, thereby allowing controller 22 to enter initialization mode 76 in different and/or additional manners. When initialization mode 76 is entered, apparatus 10 provides a "confirmation" or signal to the user or operator of apparatus 10. In one non-limiting embodiment, controller 22 signals motor 26 to move window 16 three millimeters down, three millimeters up, two consecutive times, as a confirmation that controller 22 is in initialization mode 76.

In initialization mode 76, controller 22 "learns" the "fully open" position, the "fully closed" position and the "vent" position, and stores the corresponding values describing or representing these positions within memory 24. Particularly, controller 22 stores the position of motor 26 while window 16 is in the fully closed or "zero" position within memory 24, and conventionally uses this data value as a point of reference for the movement and/or positioning of window 16. That is, controller 22 moves window 16 from the "zero" or fully closed position to a fully open position and saves or "stores", within memory 24, the number of revolutions or "turns" of motor 26, which are required to move window 16 from the fully closed position to the fully open position. A predetermined value representing the vent position, or the distance that the top edge 17 of window 16 resides below the top window seal 19 closed position while the window 16 is in the vent position, is stored within memory 24. Controller 22 uses this predetermined value along with the stored initialization data to selectively move window 16 from the fully open position to the vent position and from the fully closed position to the vent position. In the preferred embodiment of the invention, the vent position is "set", predetermined, and/or programmed so that the top edge 17 of window 16 is disposed at a distance 104 of approximately 58 millimeters below the top rear window seal 19 of cab 14. In other alternate embodiments, distance 104 has other values.

Once the initialization procedure is complete, as shown in block 102, controller 22 sets the initialization flag to one, provides a confirmation signal to the user, and enters into the normal operating mode 78. In one non-limiting embodiment, the confirmation signal includes moving window 16 down and up in 3 millimeter increments. If the initialization procedure is not completed within a predetermined period of time, such as within five minutes, or if the ignition switch 36 is turned to the "OFF" or the "START" position while controller 22 is in initialization mode 76, controller 22 returns to error mode 74, as illustrated by block 100.

Once apparatus 10 has been initialized, controller 22 will remain in normal operating mode 78 until controller 22 senses or detects an error or until an initialization sequence is performed. Particularly, if an error or malfunction within switch 28 is detected (e.g., if one or more terminals of switch 28 become grounded or "short-circuited"), or if an error or malfunction within motor 26 is detected (e.g., if motor 26 turns in a direction opposite to the commanded direction, and the window 16 is in either the "fully open", "fully closed" or "vent" position), controller 22 proceeds to block 90, where it sets a one second timer. In block 92, controller 22 determines whether the detected switch or motor error is still present. If the error is still present after one second, controller 22 enters error mode 74; and if the error is no longer present, controller 22 returns to normal operating mode 78. In this manner, controller 22 allows for transient switch and motor errors to occur without causing apparatus 10 to enter error mode 74, which would require apparatus 10 to be re-initialized.

If controller 22 is "reset" (e.g., if controller 22 temporarily loses power) while controller 22 is in normal operating mode, and window 16 is in an "invalid" position (i.e., a position other than the normally open, normally closed or vent positions), controller 22 enters position recovery mode 80. In position recovery mode 80, window 16 is movable in the directions of arrows 30 and 32 in increments of a predetermined distance, by use of switch 28. More particularly, window 16 is incrementally movable in response to the clockwise and counterclockwise movement of switch 28. In the preferred embodiment of the invention, this predetermined or "incremental" distance is set to a relatively small value, such as fifteen (15) millimeters. To perform these incremental movements, controller 22 sources or provides power to motor 26 for a predetermined and relatively short period of time, each time the switch 28 is actuated. The relatively short increments of distance and time that window 16 moves, ensure that the maximum velocity of the window 16 remains relatively low, thereby preventing damage to window 16 and/or any obstacle or obstruction which may reside within the path of travel of window 16.

Controller 22 remains within position recovery mode until the window 16 returns to its original or "fully closed" position, in which it abuts window seal 19, as shown in block 98. Once window 16 reaches the fully closed position (e.g., motor 26 stalls in the fully closed position), controller 22 "resets" or restores this original or "zero" positional value within memory 24, and returns to normal operating mode 78. While controller 22 is in position recovery mode 80, the inputs into controller 22 continue to be saved and stored within memory 24, and are compared to the initialization mode entering sequences stored within memory 24. Hence, if an initialization entering sequence is entered while controller 22 is in within position recovery mode 80, controller 22 will enter initialization mode 76, as shown in block 94.

Figure 5A:
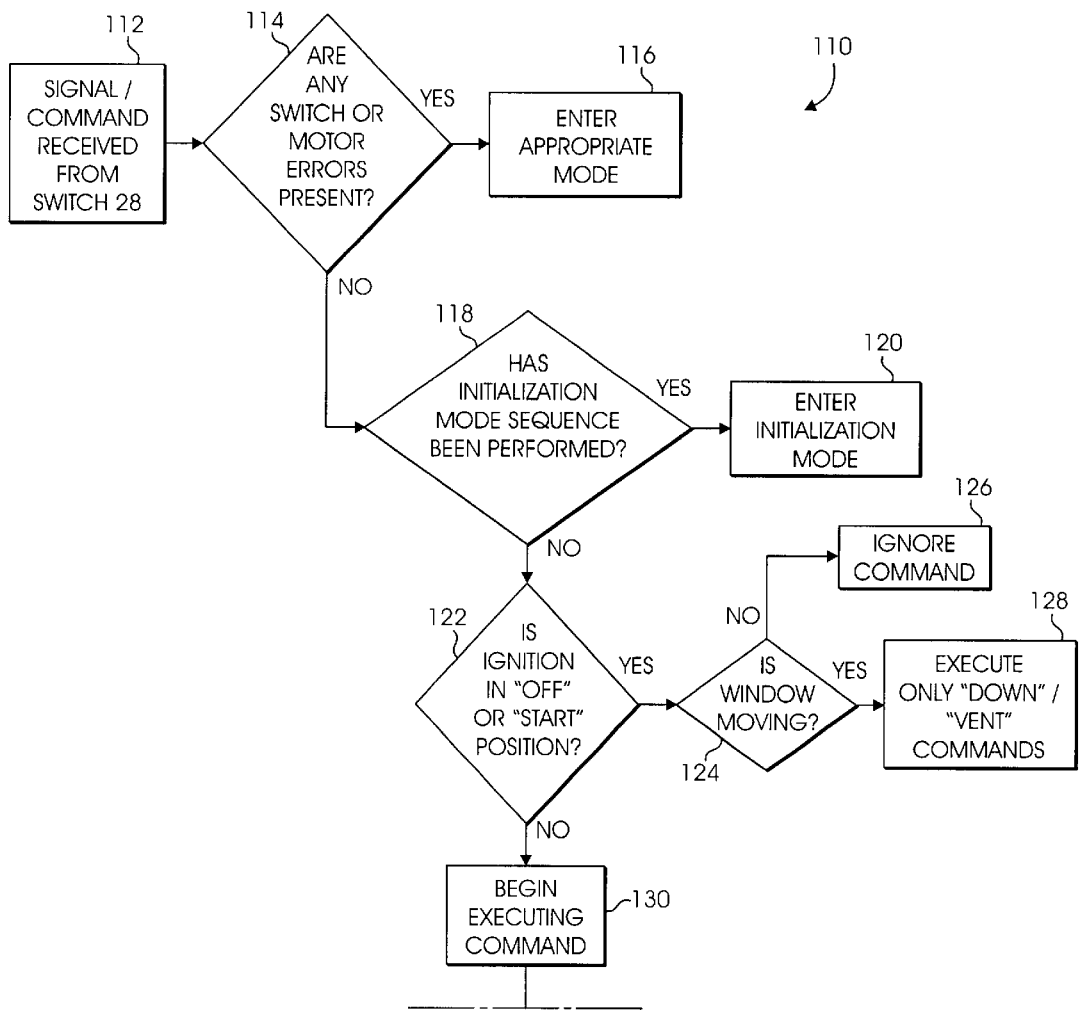
FIGS. 5A and 5B illustrate a flow chart which demonstrates certain functionality associated with the "normal operating mode", of the apparatus shown in FIG. 1.
Figure 5B:
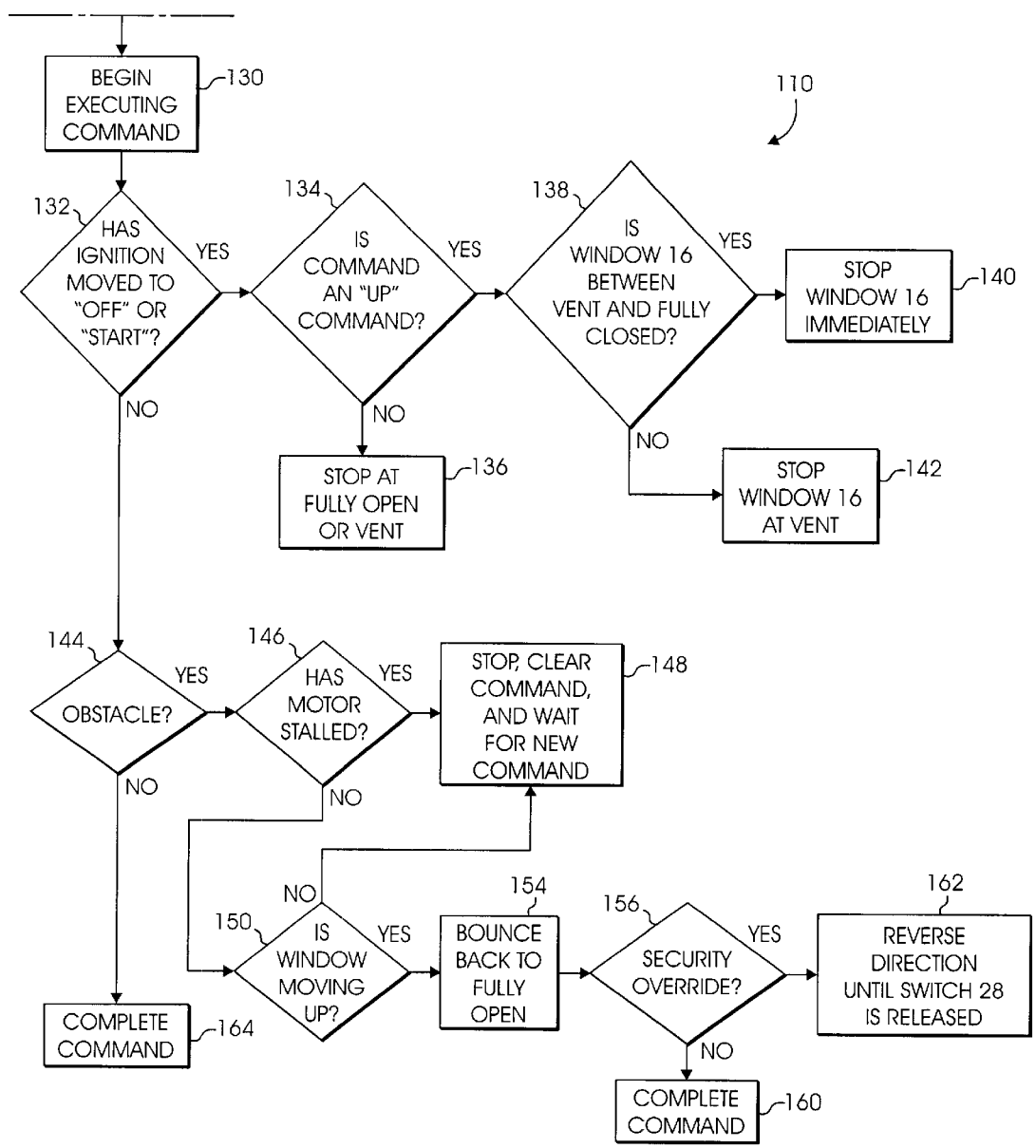

The functionality of apparatus 10 in normal operating mode 78 is best shown by the control diagram or flow chart 110, which is illustrated in FIGS. 5A and 5B. As discussed more fully and completely below, in normal operating mode 76, window 16 may only be operatively positioned in either the fully open position, the fully closed position or the vent position, which are respectively set during the initialization of apparatus 10. In this manner, window 16 is not "proportionally" movable and can only reside in one of the three predetermined positions. While in normal operating mode 78, controller 22 recognizes and executes commands from switch 28 in a "one touch" manner. That is, a single pulse from switch 2E; causes controller 22 to execute the corresponding command. Hence, the user is typically not required to hold switch 28 in any of the previously described positions for controller 22 to execute the command associated with that position, except as otherwise explained below.

In block 112, controller 22 receives a signal or command from switch 28. In step 114, controller 22 determines if any switch or motor errors are present, and if one or more errors are present, controller 22 enters the appropriate mode (e.g., position recovery mode 80 or error mode 74), as previously described in flow chart 70. If no errors are present, controller 22 proceeds to block 118, where it determines whether an initialization mode entering sequence has been performed (e.g., whether the last command received completes one of the predetermined initialization mode entering sequences, which are stored within memory 24). If an initialization mode entering sequence has been performed, controller 22 enters initialization mode 76, as shown in block 120.

Otherwise, controller 22 proceeds to step 122, where it determines whether the ignition switch 36 is in either the "OFF" or the "START" position. If the ignition switch 36 is in the "OFF" or "START" position, controller 22 determines, in step 124, whether the window 16 is presently moving (e.g., is motor 26 presently rotating). If the window 16 is not presently moving, the received command is ignored, as illustrated by block 126. If the window 16 is presently moving, the command is ignored, unless it is a "DOWN" or a "VENT" command (e.g., a counterclockwise activation or a depression of switch 28). If a "DOWN" or "VENT" command is requested, controller 22 will direct motor 26 to respectively move window 16 to the "fully open" position or to the "vent" position.

If the ignition switch 36 is not in the "OFF" or the "START" position when the command is received (i.e., ignition switch 36 is in the "RUN" or "ACCESSORY" position), controller 22 proceeds to step 130, where it substantially immediately begins to execute the command. If the state of the ignition switch 36 does not change during the execution of the command (e.g., as shown in block 132), and no obstacles are encountered during the movement of window 16 (e.g., as shown in block 144), controller 22 will fully or completely execute the command, as shown in block 164, unless a new and different command is received prior to the completion of the originally received command. If a new and different command is received, controller 22 will stop executing the old command and begin executing the new command. Hence, controller 22 allows a user or operator of apparatus 10 to "change his/her mind", and to substantially immediately change the direction or position of window 16 while the window 16 is moving, by entering a different command into switch 28.

If the ignition switch 36 is moved to the "OFF" or "START" position at any time during the execution of a command, controller 22 moves from step 132 to step 134 where it determines whether the command being executed is an "UP" or "CLOSE" command (e.g., the clockwise activation of switch 28). If the command is a "DOWN" or "VENT" command, controller 22 will complete the command and respectively move the window 16 to the fully open or vent position, as shown in block 136. If the command is an "UP" or "CLOSE" command, controller 22 proceeds to step 138, where it determines the present position of window 16. If the top edge 17 of window 16 is between the vent position and the fully closed position, controller 22 substantially immediately stops motor 26 and window 16, and leaves window 16 in its present position, as shown in block 140. If the top edge 17 of window 16 is "below" the vent position, controller 22 continues to supply power to motor 26 and moves window 16 until window 16 reaches the vent position, as shown in block 142.

As illustrated in block 144, if an obstacle is encountered and/or detected during the execution of a command, controller 22 proceeds to block 146 and determines whether motor 26 has "stalled" or stopped. Controller 22 detects obstacles in a conventional manner, such as by monitoring the speed of motor 26. If motor 26 is "stalled", controller 22 proceeds to block 148, where it stops supplying power to motor 26, clears the received command, and "waits" for a new command switch 28. If motor 26 is not "stalled", controller 22 determines if the window 16 is moving "UP" at the time that it encounters the obstacle, as shown in block 150. If the window 16 is moving "DOWN" (i.e., in the direction of arrow 30) at the time the obstacle is encountered, controller 22 stops motor 26 and window 16 and clears the command, as shown in block 148.

If the window 16 is moving "UP" (i.e., in the direction of arrow 32) at the time the obstacle is encountered, controller 22 proceeds to block 154 where it performs or executes a "bounce back" function or feature.

Particularly, controller 22 causes the direction of window 16 to be "reversed", and window 16 moves down in the direction of arrow 30 toward the fully open position. If the "security override" feature or function, which is illustrated in block 156, is not implemented or executed by the user or operator, controller 22 completes the "bounce back" of window 16 and causes motor 26 to move window 16 into the fully open position. If a user or operator does not want the window to "bounce back" into the fully open position in the presence of an obstacle (e.g., if the obstacle is ice or other debris on the window), a user can activate or implement the "security override" feature, by holding and maintaining switch 28 in the clockwise direction (e.g., holding the switch 28 in the "UP" position) for at least two seconds. Once the "security override" feature is activated, motor 26 causes the window 16 to move in the direction of arrow 32 until the window 16 is fully closed or until the switch 28 is released from the "UP" position, as shown in block 162. If the switch 28 is released prior to the window 16 being fully closed, the motor 26 will re-execute the "bounce-back" function and lower window 16 to the fully open position.

It is understood that the various inventions are not limited to the exact construction illustrated and described above, but that these previously delineated inventions may be varied without departing from the scope of the inventions as described in the following claims.

What is claimed is:

1. An apparatus for use within a vehicle of the type having an ignition switch and a window and adapted to controllably move a window between a first, a second and a third predetermined and preprogrammed position, said apparatus comprising;

a motor which is operatively coupled to said window and which selectively moves said window;

a switch which generates certain commands;

a controller which is coupled to said switch, said controller having a proportional mode of operation, an error made of operation, a normal mode of operation, and a position recovery mode of operation, wherein said controller when operating within said proportional mode of operation allows the window to be moved to any desired position only when said ignition switch remains in an deactivated position and wherein when said controller is operating within said error mode of operation said controller prevents said window from moving and wherein when said controller is operating within said normal mode of operation said controller allows several window positions to be programmed within said controller and wherein when said controller is operating within said position recovery mode of operation said controller allows said window to be moved only in increments of a predetermined distance and wherein said controller remains within said position recovery mode only while said window is fully closed, wherein said controller enters said error mode of operation only upon a detection of an error which lasts more than one second.

2. The apparatus of claim 1 wherein said certain distance equals about fifteen millimeters.

3. The apparatus of claim 1 wherein said controller enters said normal operating mode of operation after said window is fully closed while said controller resides within a position recovery mode of operation.

4. The apparatus of claim 1 wherein said controller, when operating within said normal operating mode, allows said window to occupy only one of the positions.

5. The apparatus of claim 4 wherein said three positions comprise a fully open position, a closed position, and a vent position.

6. The apparatus of claim 5 wherein said controller further detects obstacles which prevent the movement of said window in a desired manner.

7. The apparatus of claim 6 wherein said controller detects whether said motor has stalled due to an obstacle.

8. The apparatus of claim 7 wherein said controller causes said window to move in an opposite direction to the direction said window was moving when said window encountered said obstacle.

\* \* \* \* \*